United States Patent
Braun et al.

(10) Patent No.: US 8,652,017 B2
(45) Date of Patent: Feb. 18, 2014

(54) RING SAW CUTTING DEVICE

(75) Inventors: Hans-Joerg Braun, Hagen (DE); Klaus-Dieter Martin, Wetter (DE)

(73) Assignee: Reika GmbH & Co. KG, Hagen (DE)

( * ) Notice: Subject to any disclaimer, the term of this patent is extended or adjusted under 35 U.S.C. 154(b) by 950 days.

(21) Appl. No.: 12/800,295

(22) Filed: May 12, 2010

(65) Prior Publication Data

US 2011/0107883 A1    May 12, 2011

(30) Foreign Application Priority Data

Nov. 6, 2009   (EP) .................................... 09013935

(51) Int. Cl.
*B23Q 3/157*   (2006.01)

(52) U.S. Cl.
CPC ..................................... *B23Q 3/157* (2013.01)
USPC ....................... 483/30; 483/9; 483/31; 483/50

(58) Field of Classification Search
USPC ........... 483/7, 8, 9, 10, 11, 14, 30, 31, 36, 49, 483/51, 902
See application file for complete search history.

(56) References Cited

U.S. PATENT DOCUMENTS

| | | | |
|---|---|---|---|
| 4,471,444 A | 9/1984 | Yee et al. | |
| 4,551,808 A | 11/1985 | Smith et al. | |
| 4,713,770 A | 12/1987 | Hayes et al. | |
| 4,802,274 A | 2/1989 | Petrof et al. | |
| 5,021,941 A | 6/1991 | Ford et al. | |
| 5,115,403 A | 5/1992 | Yoneda et al. | |
| 5,238,337 A | 8/1993 | Nussbaumer et al. | |
| 5,257,199 A * | 10/1993 | Tsujino et al. | 700/160 |
| 6,102,838 A * | 8/2000 | Assie | 483/1 |
| 6,138,056 A | 10/2000 | Hardesty et al. | |
| 6,203,477 B1 * | 3/2001 | Shimomura | 483/1 |
| 7,011,613 B2 | 3/2006 | Moller et al. | |
| 7,918,630 B2 | 4/2011 | Barnes | |
| 2005/0154488 A1 | 7/2005 | Esterling | |
| 2006/0074513 A1 | 4/2006 | DeRose et al. | |
| 2006/0283296 A1 | 12/2006 | Borzym | |
| 2007/0088456 A1 | 4/2007 | Schmitz et al. | |
| 2009/0030545 A1 | 1/2009 | Masuya et al. | |
| 2009/0165615 A1 | 7/2009 | Nishimiya et al. | |
| 2009/0241748 A1 | 10/2009 | Keller et al. | |
| 2010/0145498 A1 | 6/2010 | Uchikawa et al. | |

FOREIGN PATENT DOCUMENTS

DE   43 12 162 A1   10/1994
EP   0 490 328   6/1992

* cited by examiner

*Primary Examiner* — Andrea Wellington
*Assistant Examiner* — Alan Snyder
(74) *Attorney, Agent, or Firm* — Collard & Roe, P.C.

(57) ABSTRACT

A device for cutting tubular and rod-shaped work pieces using the whirling method includes a whirling unit on which a holder mounted so as to rotate, connected with a drive, for a saw blade having internal teeth is disposed. The holder and saw blade are provided with corresponding reference mechanisms for fixation of the saw blade in a defined position. The device also includes a mechanism for automatic replacement of the saw blade. A saw blade having internal teeth is also provided for use in this device. The saw blade has at least two indexing bores and at least two gripping openings, which are disposed offset relative to one another.

14 Claims, 8 Drawing Sheets

RING SAW CUTTING DEVICE

CROSS REFERENCE TO RELATED APPLICATIONS

Applicants claim priority under 35 U.S.C. §119 of European Application No. 09013935 filed on Nov. 6, 2009.

BACKGROUND OF THE INVENTION

1. Field of the Invention

The present invention relates to a device for cutting tubular and rod-shaped work pieces using the whirling method, including a whirling unit on which a holder mounted so as to rotate, connected with a drive, for a saw blade having internal teeth is disposed, whereby holder and saw blade are provided with corresponding reference means for fixation of the saw blade in a defined position. The invention furthermore relates to a saw blade with internal teeth for use in this device.

2. The Prior Art

The whirling method is a chip-lifting method in which the tool circles around the work piece in the manner of a spiral whirling. The cutting depth is produced using one or more blades that rotate at a high cutting speed in a single work cycle. In this connection, the inner mantle surface formed by the cutting tool rolls on the cylindrical outer mantle surface of the work piece to be processed. This movement process is superimposed on the constantly circular movement of the cutting tool.

The whirling method has the advantage that a great number of cutting tools, particularly separating steels, can be disposed next to one another, and stand in engagement with the work piece over a larger segment region, at the same time. In whirling cutting, a whirling saw tool with internal teeth is used in this connection. The cutting teeth of the whirling tool with internal teeth can penetrate tangentially into the work piece. Because of the whirling method, the effective penetration radius of the whirling tool has to cover only the wall thickness of the work piece. If this work piece is a solid material, the whirling tool has to penetrate only to the center point of the solid material because the other half of the work piece is cut off by means of the circular movement of the whirling tool.

Use of the whirling method for cutting tubular and rod-shaped work pieces has proven itself; in particular, in this connection, the processing times can be clearly reduced. Replacement of the saw blade with internal teeth, however, proves to be time-consuming because the heavy saw blades have to be removed from the tool holder and clamped into it by hand. This procedure is all the more complicated if the saw blade has a high temperature due to a cutting process that took place within a short period of time.

SUMMARY OF THE INVENTION

It is an object of the present invention to provide a remedy for these disadvantages. The invention is based on the task of providing a device of the type previously stated, which allows time-optimized replacement of the saw blade, even at a high saw blade temperature. According to the invention, this task is accomplished by a device for cutting tubular and rod-shaped work pieces using the whirling method having a means for automatic replacement of the saw blade.

With the invention, a device for cutting tubular and rod-shaped work pieces using the whirling method is provided, which allows time-optimized replacement of the saw blade even at high saw blade temperatures. Hereinafter, the term "saw blade" subsumes all ring-shaped tools with internal teeth that are suitable for cutting tubular and rod-shaped work pieces. This term also includes, for example, milling tools configured in ring shape.

In a further aspect of the invention, the whirling unit is disposed within a unit portal, whereby another support portal is disposed parallel to the unit portal, and connected with the unit portal by way of at least one rail. A change-over device is mounted on the at least one rail so as to be displaced via a drive. In this way, a precise, defined linear displacement of the changeover device within a rigidly connected support system is brought about. Thus, bringing in and removing a saw blade can take place on a defined spatial axis.

In an embodiment of the invention, the changeover device has at least one holder for a saw blade that comprises holder fingers that correspond with gripping openings present in the saw blade. In this way, time-optimized, reliable holding of a saw blade is made possible.

In another embodiment of the invention, the change-over device has two arms disposed to lie opposite one another. The arms form a holder for a saw blade and at least one holder finger is disposed on the arms in each instance. In this connection, the arms are preferably configured as clamping arms, in such a manner that they are suitable for handling and clamping a work piece to be processed. In this way, a combined pick-up is brought about, which, in the form of an integrated component, not only can perform a tool replacement but also can be used to handle and clamp a work piece to be processed. In this way, the installation space required is clearly reduced. The method steps "handling and clamping the work piece" and "performing a tool replacement" can therefore take place on one and the same linear rail, with one and the same drive.

In a further aspect of the invention, the clamping arms are mounted in floating manner and have clamping jaws that can be braced against one another, whereby a fixation mechanism is provided that is set up in such a manner that the clamping arms are locked in place only when the two clamping jaws rest against the work piece. In this way, the risk of incorrect bracing of the work piece when it is clamped in place is counteracted. Slight unevenness of the rod-shaped work piece can therefore be balanced out.

It is advantageous if locking takes place mechanically and with shape fit. In this way, a high degree of process safety in clamping the work piece is achieved.

In an embodiment of the invention, the holder of the whirling unit comprises indexing pins that correspond with indexing bores present in the saw blade. In this way, automatic fixation of a saw blade brought in by the changeover device, in a defined position, is made possible. Preferably, the indexing pins have bracing elements for a force-fit connection with the saw blade. The bracing elements can preferably be activated pneumatically, hydraulically, or electrically.

Alternatively, in place of the indexing pins, indexing bores can also be disposed in the holder of the whirling unit, which bores correspond with indexing bolts present on the saw blade. In this case, the indexing bores preferably have locking elements for a force-fit and/or shape-fit connection with the indexing bolts of the saw blade.

In a further aspect of the invention, the change-over device has a displaceable carriage for bringing in and removing saw blades. At least one holder for a saw blade is disposed on the displaceable carriage. In this connection, it is advantageous if the holder has at least one holding pin that corresponds with a holding opening disposed in the saw blade. In this way, reliable loading and unloading of the changeover device with saw blades is made possible.

In an advantageous embodiment of the invention, the carriage is disposed on a telescope rail by way of which it can be moved. In this way, the required construction space is optimized.

In an embodiment of the invention, means for positioning the tool holder in a defined rotational position are disposed on the whirling unit. In this way, identical placement of the tool holder during every tool replacement process is made possible, so that no additional position adjustments by means of the changeover device are necessary.

In an embodiment of the invention, a handling device for loading and unloading the carriage with saw blades is provided. In this way, fully automatic loading and unloading of the whirling unit with saw blades, without any operating personnel required, is made possible. As a result, a continuous production process is guaranteed.

In a further aspect of the invention, the handling device has means for reading tool data out of a data memory disposed on a saw blade. In this way, fully automatic selection of a suitable saw blade is made possible, against the background of the work piece to be processed.

The invention is furthermore based on the task of providing a saw blade for use in a device for cutting tubular and rod-shaped work pieces, which blade allows time-optimized saw blade replacement even at high tool temperatures. According to the invention, this task is accomplished by a saw blade with internal teeth wherein at least one indexing bore or at least one indexing bolt and at least two gripping openings are present, which are disposed offset relative to one another.

In a further aspect of the invention, at least one holding opening is provided, which is disposed offset relative to the gripping openings and the indexing bores. This holding opening allows fixation of the saw blade on the carriage for providing material to the changeover device. A locking bolt of the carriage can be guided by means of the at least one holding opening. In this way, the saw blade is fixed in place on the carriage. The gripping openings required for holding the saw blade on the changeover device are not obstructed in this way.

In a further embodiment of the invention, means for storing tool data in memory are provided. In this way, identification of a saw blade required for the cutting process is made possible. The means for storage in memory can be not only tactile but also optical (bar code) or electronic (RFID chip) data carriers. For reading out the data, a corresponding reader is simply disposed on the handling device.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
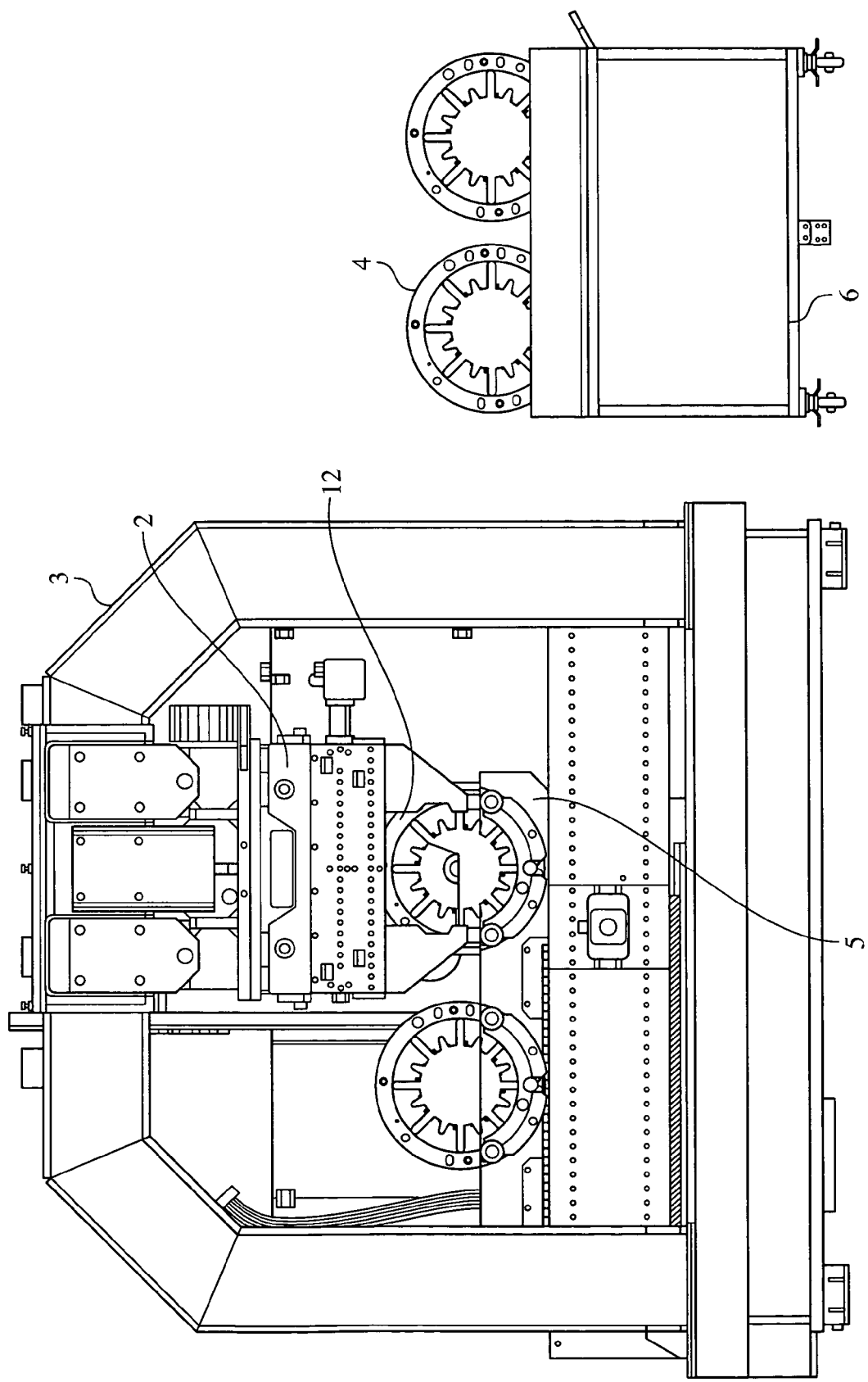
FIG. 1 is a schematic representation of a whirling cutting device in a view from the rear.
Figure 2:
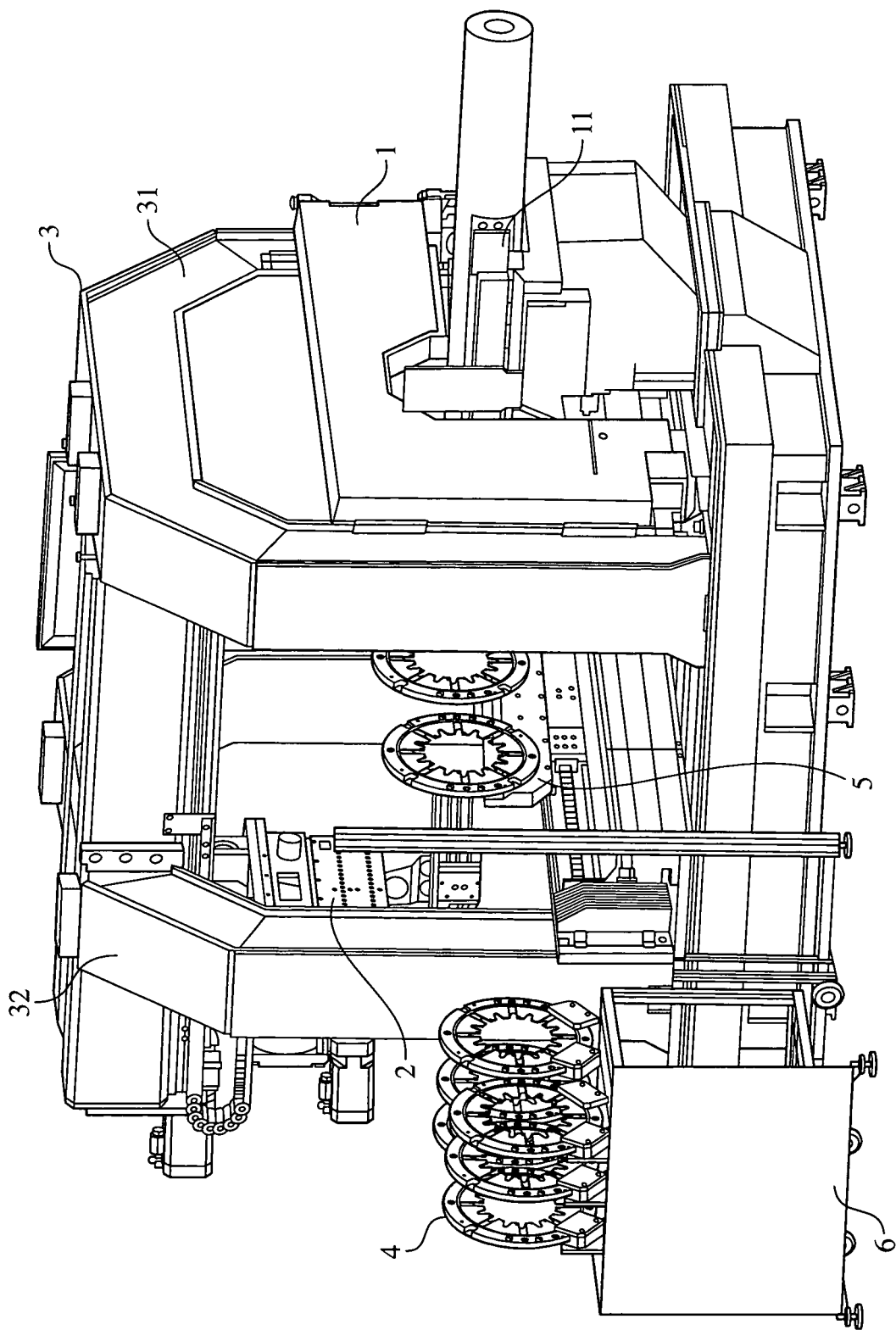
FIG. 2 shows the device from FIG. 1 in a spatial representation.
Figure 3:
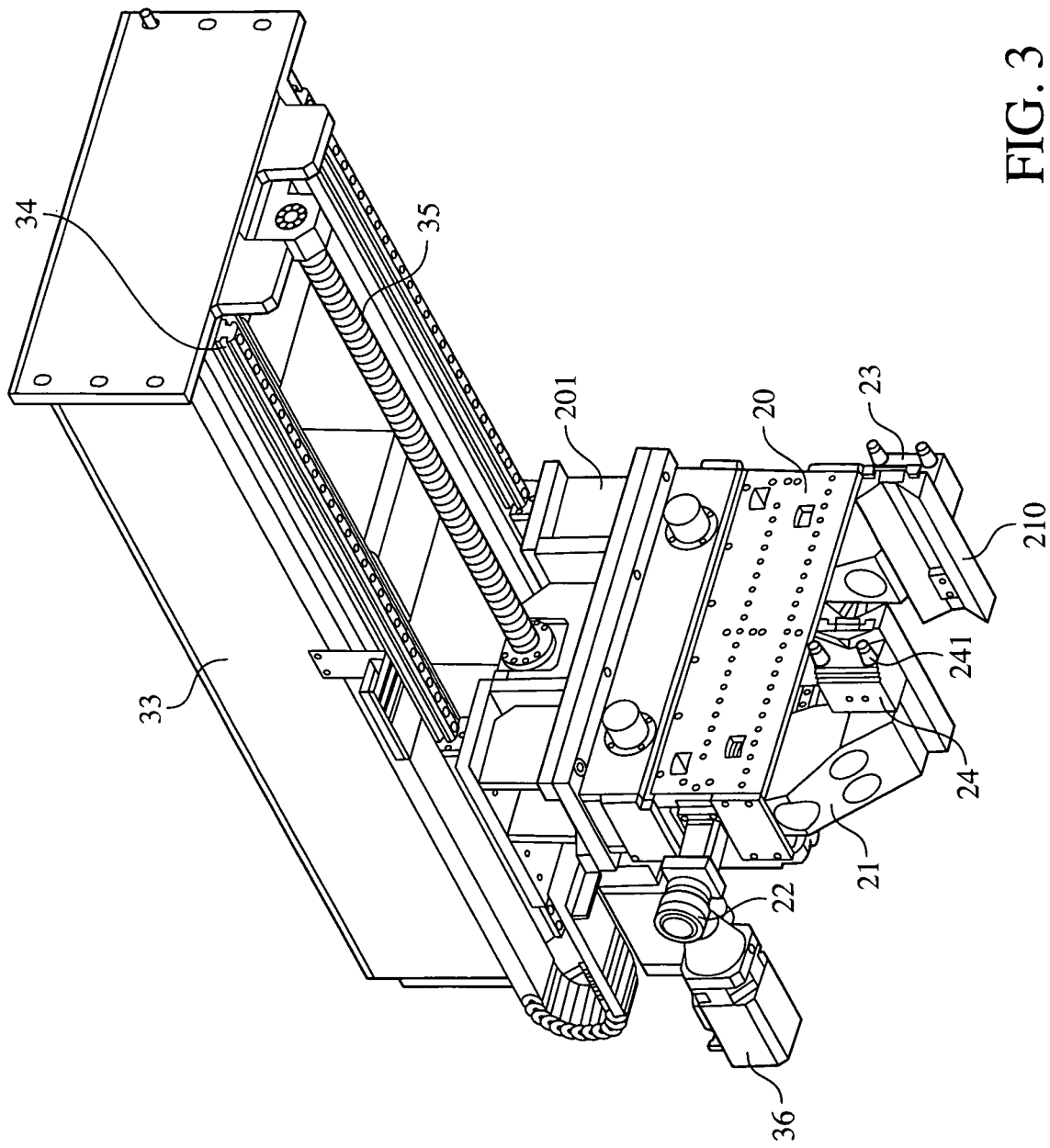
FIG. 3 is a detailed view of the pick-up of the device from FIG. 1.

The whirling cutting device selected as an exemplary embodiment comprises a whirling unit 1 having a work piece clamping device 11 as well as a pick-up 2, which are disposed in a frame system 3. In this connection, frame system 3 is essentially formed from two portals 31, 32 that are disposed parallel to one another and are connected with one another, on the head side, by way of a connection beam 33. In this connection, the whirling unit is attached to the unit portal 31; the support portal 32 serves for the bearing of connection beam 33. A rail 34 is attached to connection beam 33, on which rail pick-up 2 is disposed in displaceable manner.

Whirling unit 1 comprises a tool holder 12 that is connected with a drive—not shown. The drive has an angle generator that allows precise positioning of the tool holder. Tool holder 12 is connected with a cross table arrangement by means of which it can be moved on defined curves, by way of a control.

Tool holder 12 is essentially drum-like and configured to be conical, for removal of chips. In tool holder 12, around its circular opening, a contact flange 13 is disposed, for precision-fit contact of a saw blade 4. For centering saw blade 4 in tool holder 12, contact flange 13 is provided circumferentially with a bevel—not shown—which corresponds with a corresponding bevel 42 of the blade carrier ring 41 of saw blade 4. On the circumference, four indexing pins 14 are disposed on contact flange 13, offset by 90 degrees relative to one another, in each instance, which pins engage into corresponding indexing bores 43 of saw blade 4. Indexing pins 14 have bracing elements 141 activated by spring pressure, by way of which elements saw blade 4 can be braced in tool holder 12. Offset by 45 degrees relative to indexing pins 14, in each instance, four t-nuts 15 are affixed to the circumference of contact flange 13. T-nuts 15 engage into corresponding indentations 44 of blade carrier ring 41 of saw blade 4. T-nuts 15 serve for torque transfer and for centering of saw blade 4. A gear mechanism 16 for accommodating a drive belt—not shown—is disposed on the circumference of the drum-shaped tool holder 12.

Pick-up 2 surrounds two clamping arms 21 that are disposed in a housing 20, lying opposite one another, and can be moved in opposite directions, centered relative to the work piece diameter, by way of a clamping drive 22. Clamping jaws 210 that can be braced against one another are disposed on clamping arms 21. Housing 20 is mounted to float on a drive flange 201, by way of which pick-up 2 can be moved along the rails 34 of connection beam 33. This floating mounting can be fixed in place by way of a mechanical locking mechanism—not shown. A rod-shaped work piece to be processed can be clamped between clamping jaws 210, whereby when the two clamping jaws 210 lie against the work piece, the position of the pick-up housing 20 is fixed in place by way of clamping elements of the mechanical locking mechanism. Clamping jaws 210 can be moved toward one another by way of a servo-controlled clamping drive 22. Different clamping forces can be set by way of the servo-controlled clamping drive, so that thin-walled pipe sections can be clamped without being irreversibly deformed.

On their side facing whirling unit 1, holders 23 are disposed on clamping jaws 210, which hold two pneumatic cylinders 24 that lie opposite one another, in each instance. By way of pneumatic cylinders 24, holding fingers 241 can be moved to pass through gripping openings made in saw blade 4. In this way, fixation of saw blade 4 on holders 23, in the correct position, is brought about.

Pick-up 2 is displaceably mounted on rails 34 of connection beam 33 of frame system 3 by way of pick-up housing 20. The movement along rails 34 takes place by way of a spindle axle 35 disposed on connection beam 33, which axle is connected with a spindle drive 36 and guided by means of the drive flange 201.

Figure 4:
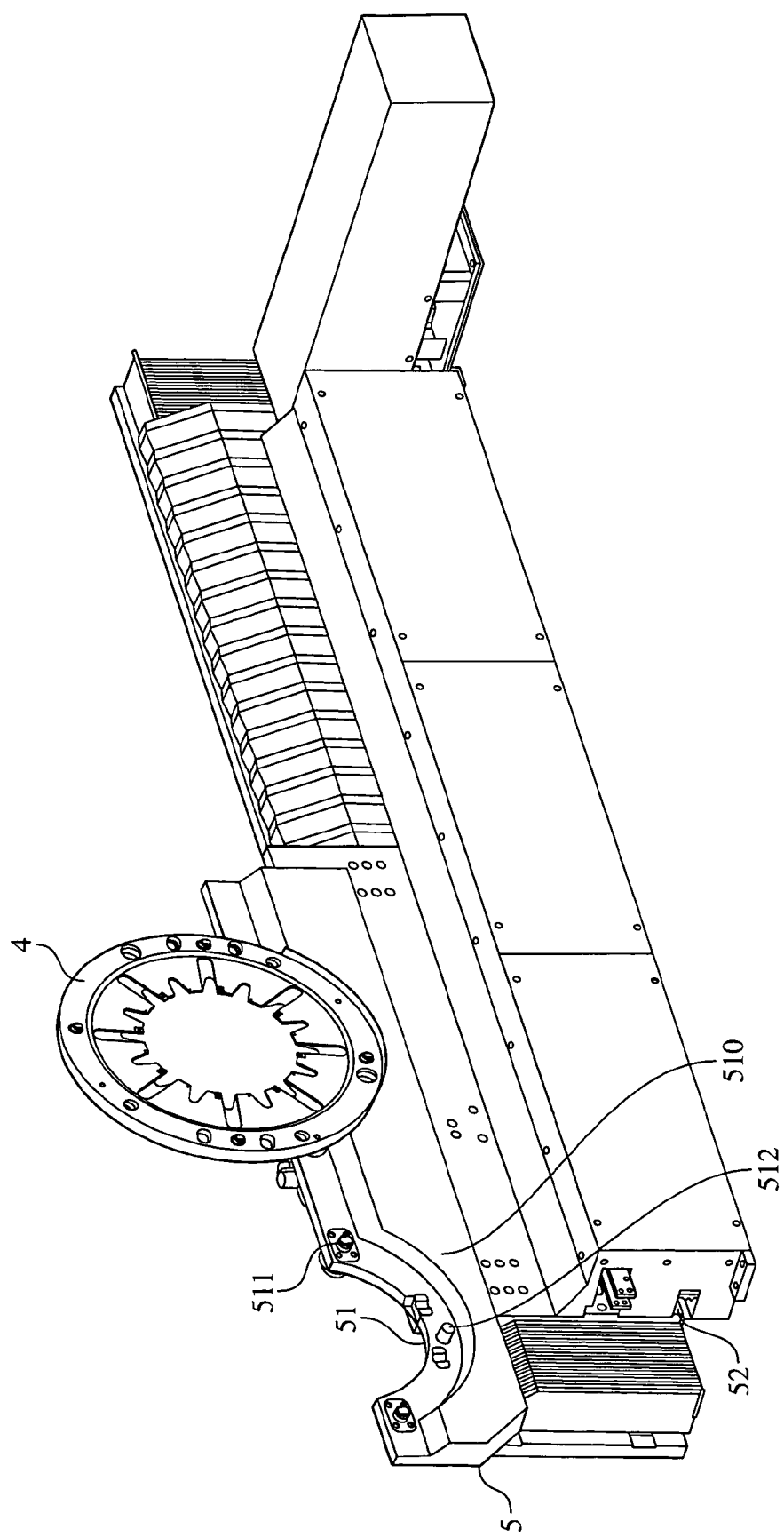
FIG. 4 is a detailed representation of the carriage of the device from FIG. 1.
Figure 5:
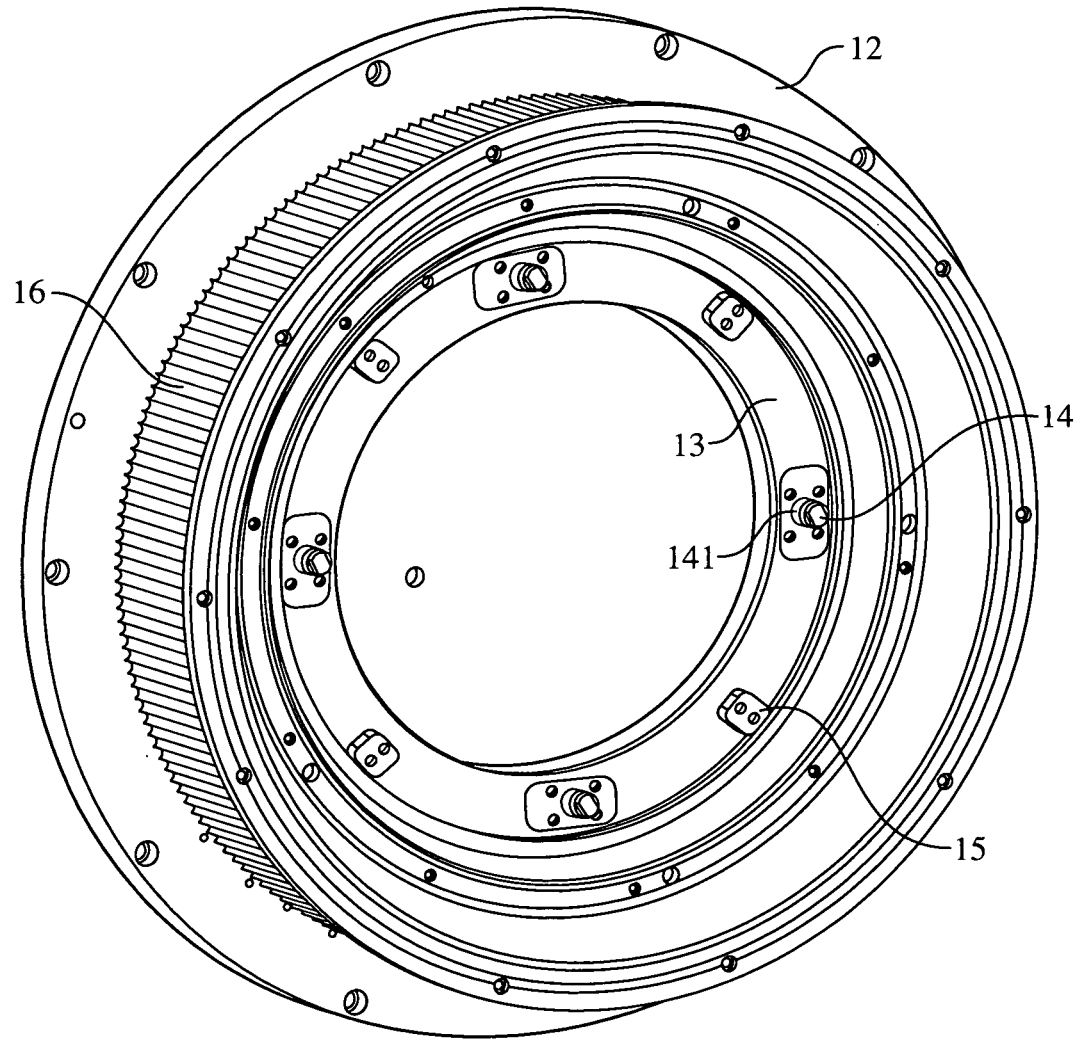
FIG. 5 shows the tool holder of the whirling unit of the device from FIG. 1.
Figure 6:
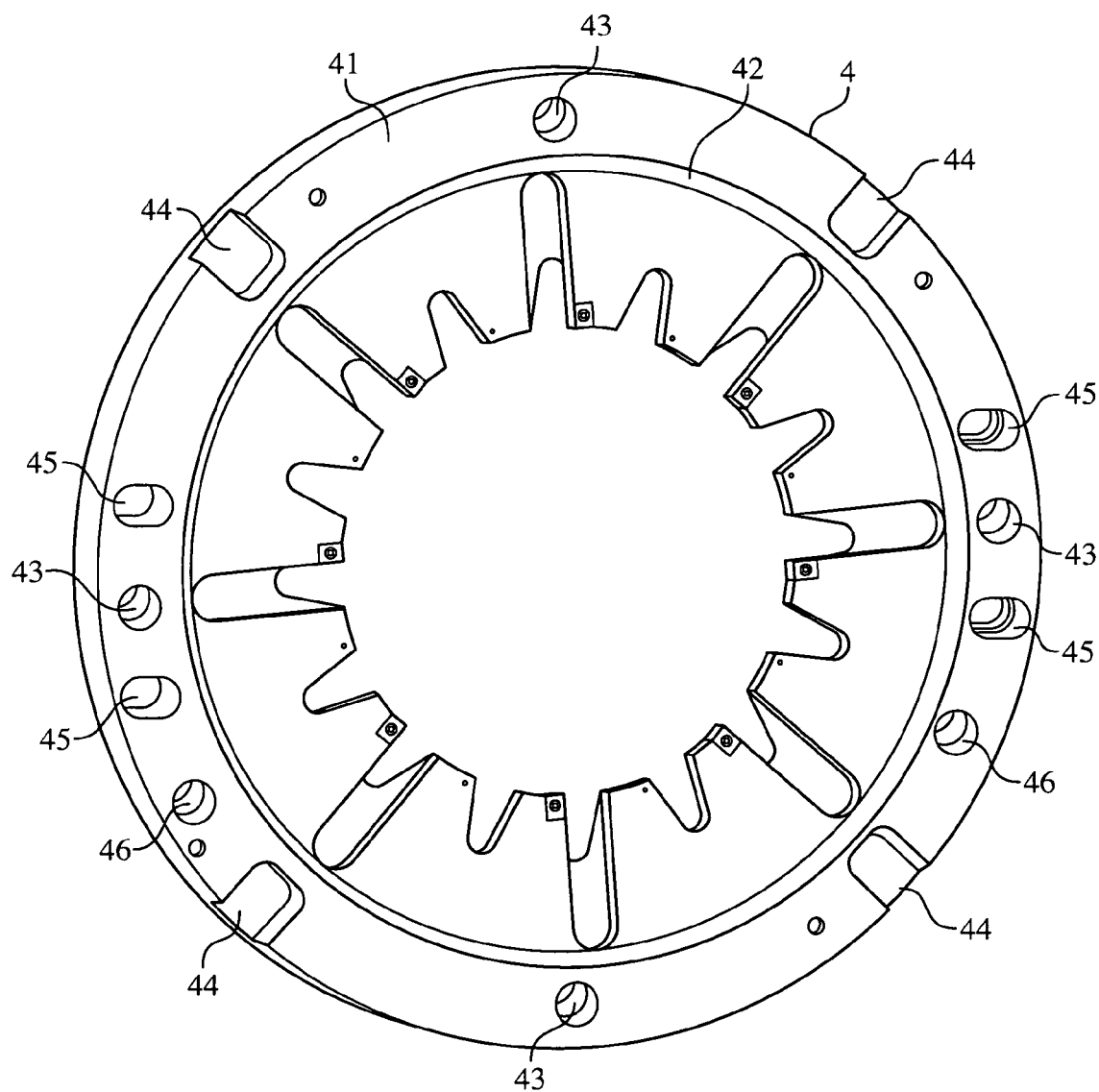
FIG. 6 shows a saw blade for use in the device from FIG. 1.

Loading holders 23 of pick-up 2 with saw blades 4 takes place by way of a change-over carriage 5 that is attached to support portal 32 of frame system 3. In the exemplary embodiment, change-over carriage 5 has two tool holders 51, whereby one of the tool holders 51 serves to hold the new saw blade, and the other tool holder 51 serves to hold the removed saw blade 4. Change-over carriage 5 is connected with a telescope guide 52 by way of which it can be moved by means of a slide chain drive 53. For an exact transfer position, the change-over carriage can be mechanically locked in place in defined positions, in each instance. The positions of the telescope carriages of telescope guide 52, in each instance, are clearly defined by way of built-in braking units—not shown. In FIG. 4, change-over carriage 5 is shown with telescope guide 52 completely extended.

Tool holder 51 comprises a contact flange 510 that describes an arc, which covers 135 degrees of blade carrier ring 41 of a saw blade 4 in the exemplary embodiment. At its opposite ends, two holding bolts 511 are formed onto the contact flange 510, lying opposite one another, which bolts correspond with holding openings 46 disposed in blade carrier ring 41 of saw blade 4. An indexing pin 512 is disposed centered between holding bolts 511 on contact flange 510. Indexing pin 512 engages into an indexing bore 43 of saw blade 4, and thereby guarantees that saw blade 4 is held in the proper position.

For providing material to the tool carriage 5, in the exemplary embodiment a supply wagon 6 is provided, on which saw blades 4 are kept available and replaced saw blades can be deposited. Loading and unloading of change-over carriage 5 takes place manually in the exemplary embodiment. A handling device can also be provided, however, which takes over loading and unloading of change-over carriage 5. When different saw blades 4 are used, these blades can be equipped with a data carrier in which the essential tool data are stored. These data can then be read by way of a reader disposed on the handling unit, thereby making it possible to identify different saw blades. Identification of the different saw blades can also take place by way of combinations of switches disposed on change-over carriage 5. By means of specific recesses in the saw blades 4, different switch combinations assigned to the saw blade type, in each instance, are addressed in this connection.

To optimize the tool replacement, in the exemplary embodiment, a saw blade 4 is used, which consists of four inserts 40 disposed reciprocally, which are delimited by a blade carrier ring 41. Blade carrier ring 41 is provided with a bevel 42, for centered introduction of saw blade 4 into the tool holder 12 of whirling unit 1. On the circumference of blade carrier ring 41, four indexing bores 43 are made, offset from one another by 90 degrees, in each instance, which correspond with indexing pins 14 of whirling unit 1. An indentation 44 is furthermore made in blade carrier ring 41, centered between two indexing bores 43, in each instance, which indentations correspond with t-nuts 25 of tool holder 12 of whirling unit 1. On both sides of two indexing bores 43 that lie opposite one another, a gripping opening 45 is furthermore made in blade carrier ring 41, in each instance. Gripping openings 45 serve to allow the holding fingers 241 of holders 23 to pass through, in order to fix saw blade 4 in place on pick-up 2. Furthermore, two holding openings 46 are made to lie opposite one another, between two opposite gripping openings 45 and two opposite indentations 44. Holding openings 46 serve to allow the holding bolts 511 of tool holder 51 of change-over carriage 5 to pass through. The different bores and passage openings are disposed in such a manner that obstruction of tool holder 51 of change-over carriage 5 and of holders 23 of pick-up 2 as well as obstruction of this holder 23 with tool holder 12 of whirling unit 1 is precluded.

During the course of a tool replacement, first a saw blade 4 is introduced into a tool holder 51 of change-over carriage 5, which is completely moved out for this purpose. In this connection, the indexing pins 512 as well as the holding bolts 511 pass through the indexing bore 43 and the holding openings 46 of saw blade 4, respectively. Saw blade 4 is held in tool holder 51 by means of holding bolts 511. Subsequently, change-over carriage 5 moves in along telescope guide 52 to such an extent that saw blade 4 assumes the position required for transfer of saw blade 4 to pick-up 2. Pick-up 2 is moved along rail 34 of frame system 3 in front of saw blade 4, and the holding fingers 241 are moved through the gripping openings 45 of saw blade 4. After fixation of saw blade 4 by means of holding fingers 241, saw blade 4 is released by holding bolts 511 of the change-over carriage.

Pick-up 2 now moves along rail 34 of frame system 3, in front of tool holder 12 of whirling unit 1, by way of spindle drive 36, until indexing pins 14 of tool holder 12 pass through indexing bores 43 of saw blade 4, and blade carrier ring 41 lies against contact flange 13 in tool holder 12. Bracing elements 141 of indexing pins 14 are now pressed against the indexing bores, under spring pressure, so that saw blade 4 is fixed in place in tool holder 12 of whirling unit 1. Subsequently, holding fingers 241 are moved out of gripping openings 45 of saw blade 4, and pick-up 2 is moved out of whirling unit 1, along rails 34 of connection beam 33.

After the work piece has been passed through whirling unit 1 by means of the work piece feed 11, for the subsequent cutting process, it is fixed in place between clamping jaws 210 of pick-up 2. After clamping jaws 210 have been laid against the work piece, the clamping arms are mechanically locked.

Subsequent to the cutting process, the cut-off work piece part can be laid down by way of pick-up 2. Removal of a saw blade from tool holder 12 of whirling unit 1 takes place in the opposite sequence. In this connection, the removed saw blade 4 is laid down in the free tool holder 51, after corresponding positioning of change-over carriage 5; subsequently, change-over carriage 5 is positioned so that a saw blade 4 that was previously laid into the other tool holder 51 can be picked up by pick-up 2.

Figure 7:
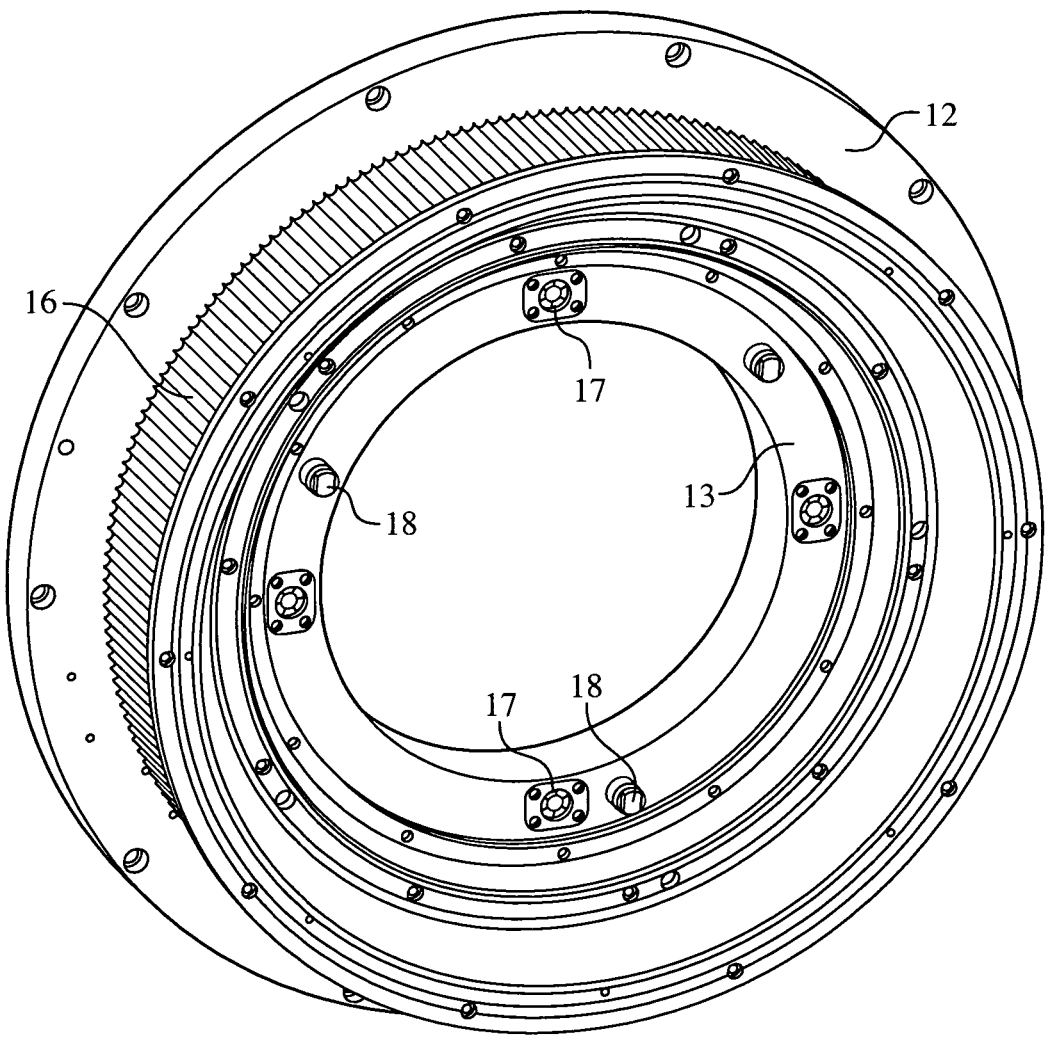
FIG. 7 shows another embodiment of a tool holder of the whirling unit.
Figure 8:
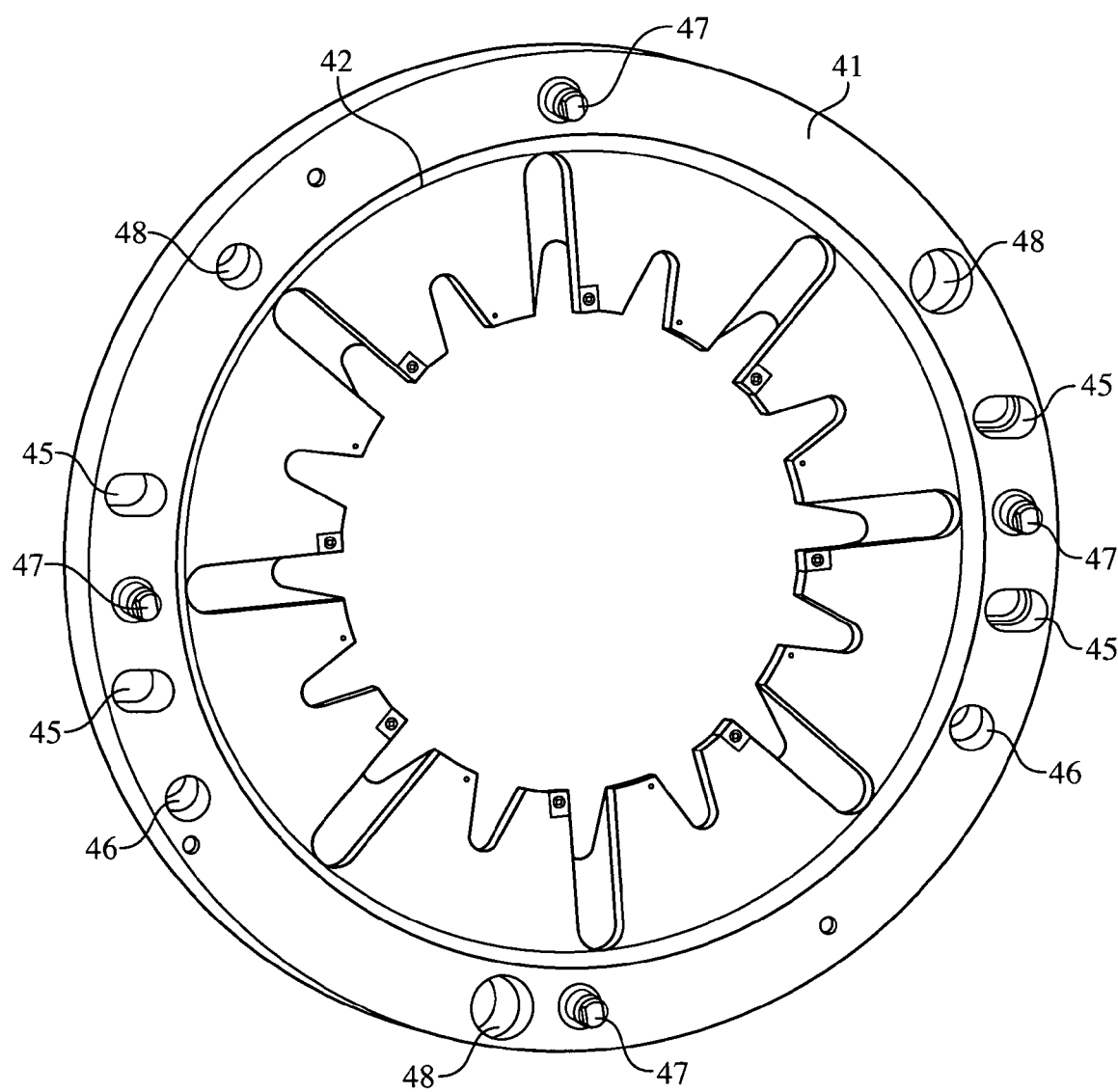
FIG. 8 shows another embodiment of a saw blade for use in the tool holder according to FIG. 7.

In the exemplary embodiment according to FIG. 7, four indexing bores 17 are disposed on the circumference of contact flange 13 of tool holder 12, offset by 90 degrees from one another, in each instance, into which corresponding indexing bolts 47 of saw blade 4 engage. Indexing bores 17 have locking elements by way of which indexing bolts 47 of saw blade 4 can be fixed in place in tool holder 12.

Three centering bolts 18 are affixed to the circumference of contact flange 13, offset by 120 degrees from one another, in each instance. Centering bolts 18 engage into corresponding centering bores 48 of blade carrier ring 41 of saw blade 4. Centering bolts 18 serve for torque transfer and for centering of saw blade 4.

Although only a few embodiments of the present invention have been shown and described, it is to be understood that many changes and modifications may be made thereunto without departing from the spirit and scope of the invention.

What is being claimed is:

1. A device for cutting tubular and rod-shaped work pieces using a whirling method comprising:
    (a) a whirling unit;
    (b) a tool holder rotatably mounted to the whirling unit;
    (c) a drive connected with the tool holder;
    (d) a saw blade having a plurality of internal teeth held by said tool holder, said tool holder and said saw blade being provided with corresponding reference mechanisms for fixation of said saw blade in a defined position;
    (e) an automatic replacement device for automatic replacement of said saw blade;
    (f) a unit portal;
    (g) a support portal;
    (h) at least one rail disposed parallel to the unit portal; and
    (i) a change-over device mounted on said at least one rail so as to be displaceable by way of said drive, said support portal being connected with the unit portal by way of said at least one rail, said whirling unit being disposed within said unit portal.

2. The device according to claim 1, wherein the change-over device has at least one saw blade holder for the saw blade, said at least one saw blade holder comprising a plurality of holder fingers corresponding with a plurality of gripping openings present in the saw blade.

3. The device according to claim 1, wherein the change-over device has oppositely-disposed first and second arms and at least one holding finger disposed on said first arm, said first and second arms forming a saw blade holder for the saw blade.

4. The device according to claim 3, wherein the first and second arms comprise clamping arms for handling and clamping a work piece to be processed.

5. The device according to claim 4, further comprising a locking mechanism, wherein the clamping arms are mounted in floating manner and have first and second clamping jaws, respectively, braceable against one another and the locking mechanism locks the clamping arms only when both the first and second clamping jaws contact the work piece.

6. The device according to claim 5, wherein locking takes place mechanically and with shape fit.

7. The device according to claim 1, wherein the tool holder comprises a plurality of indexing pins corresponding with a plurality of indexing bores present in the saw blade.

8. The device according to claim 7, wherein the indexing pins have clamping elements for a force-fit connection with the saw blade, said clamping elements being activated pneumatically, hydraulically or electrically.

9. The device according to claim 1, wherein the change-over device has a displaceable carriage for bringing in and removing saw blades, and at least one change-over carriage tool holder for a saw blade disposed on the carriage.

10. The device according to claim 9, wherein the change-over carriage tool holder has at least one holding bolt that corresponds with a holding opening disposed in the saw blade.

11. The device according to claim 8, wherein the carriage is disposed on a telescope rail for movement of the carriage.

12. The device according to claim 1, further comprising a device disposed on the whirling unit for positioning the tool holder in a defined rotational position.

13. The device according to claim 9, further comprising a handling device for loading and unloading the carriage with saw blades.

14. The device according to claim 13, wherein the handling device has a device for reading out tool data from a data memory disposed on the saw blade.

* * * * *